United States Patent [19]

Jonas

[11] Patent Number: 4,596,268

[45] Date of Patent: Jun. 24, 1986

[54] DIAPHRAGM VALVES FOR CORROSIVE LIQUIDS

[75] Inventor: Rolf Jonas, Kiriat Bialik, Israel

[73] Assignee: Kim Production Limited, Haifa Bay, Israel

[21] Appl. No.: 724,325

[22] Filed: Apr. 17, 1985

[51] Int. Cl.⁴ ............................................. F16L 7/00
[52] U.S. Cl. ................................. 137/375; 251/331
[58] Field of Search ............... 251/331; 137/375, 315, 137/854

[56] References Cited

U.S. PATENT DOCUMENTS

| | | | |
|---|---|---|---|
| 3,349,795 | 10/1967 | Matsutani | 137/375 |
| 3,628,770 | 12/1971 | Rost | 251/331 |

*Primary Examiner*—A. Michael Chambers
*Assistant Examiner*—Sheri M. Novack
*Attorney, Agent, or Firm*—Schwartz, Jeffery, Schwaab, Mack, Blumenthal & Evans

[57] ABSTRACT

A backing diaphragm (5) in a diaphragm valve for corrosive liquids is perforated by a centrally positioned, oblong hole. As known to the art a diaphragm valve for corrosive liquids contains a thin Teflon-diaphragm in contact with the liquid, and a thicker backing diaphragm of rubber or the like serving as a cushion. Both diaphragms are in close contact and are attached to a compressor by a stud bolt which is secured in the compressor by a bayonet closure comprising a cross pin in the top end of the stud bolt which is enclosed in a recess inside the compressor. In a known manner, during fitting of a new backing diaphragm the cross pin is inserted into the recess through a slot and rotated about an angle of 90 degrees. The oblong hole facilitates exchanging the backing diaphragm only without having to withdraw the cross pin out of the bolt, which is usually firmly retained therein by rust or dirt, by pushing the cross pin through the oblong hole and inserting it into the compressor. The diaphragms are subsequently clamped between the valve body and the bonnet.

7 Claims, 4 Drawing Figures

DIAPHRAGM VALVES FOR CORROSIVE LIQUIDS

BACKGROUND OF THE INVENTION

The invention relates to diaphragm valves and more particularly to valves for fluid control of corrosive liquids.

In a diaphragm valve for fluid control of corrosive liquids such as acids or alkalis, the diaphragm is of an anticorrosive material, preferably of Teflon ® polytetrafluoro ethylene [PTFE] manufactured by E. I. du Pont de Nemours and Co., Wilmington DL) which is, in thin sheet form, sufficiently flexible to be pressed against a seat in the valve body by a closure member known as "compressor", the latter being attached to the spindle end. Although the strength of the material is high, the teflon diaphragm requires a backing diaphragm of a polymer, such as natural or synthetic rubber, Viton or the like, which serves as a cushion pressing the PTFE-diaphragm evenly onto the valve seat.

The two diaphragms are in close contact and are secured by clamping both of them between the valve body and the bonnet, their position being fixed by holes in their corners coinciding with the holes in the valve body which serve to attach the bonnet to the body by through-going bolts and nuts. Connection between the teflon diaphragm and the compressor is conventionally made by a stud bolt having its head rigidly embedded in the center of the teflon diaphragm. Its shaft is provided, at its upper end, with a transverse hole in which a cross pin is rigidly fastened, so as to protrude out of both sides of the shaft by the same length. This pin engages with the bottom end of the compressor, in a known manner, by means of a bayonet closure in the form of a central hole and a slot crossing this hole positioned in the center of the compressor, the hole being widened inside the compressor body to permit an angular displacement of the pin in order to secure it in both upward and downward direction.

The backing diaphragm of rubber—which is generally much thicker than the teflon diaphragm—is positioned above the teflon diaphragm in close contact therewith, whereby the shaft of the stud penetrates through a cylindrical hole in its center. For closing the valve by turning the spindle, the compressor is pressed downwards onto the backing diaphragm which urges, in its turn, the teflon diaphragm onto the valve seat, the pin in the shaft end having sufficient clearance so as not being required to transmit the force from the spindle onto the diaphragm.

SUMMARY OF THE INVENTION

A problem commonly encountered with the conventional arrangement is that the exchange of the backing diaphragm requires the withdrawal of the cross pin out of the stud shaft, a task not readily carried out in the field or in a store, since the pin is necessarily solidly embedded in the transverse hole. The exchange is necessitated by either of two causes the material of the backing diaphragm has to be selected in accordance with the fluid passing through the valve with a view to resisting the corrosive effects as well as possible. Since the cost of the teflon diaphragm is a multiple of that of any rubber diaphragm, it is economical to keep a limited number of Teflon ® diaphragms and a large number of different rubber diaphragms in stock and to chose each time the suitable kind of rubber for the respective corrosive fluid. The second cause for exchanging the backing diaphragm is that this diaphragm usually deteriorates much quicker than the teflon diaphragm, requiring its replacement in the field. In this case the removal and re-insertion of the cross pin is still more difficult owing to rust causing adherence of the pin to the hole, and it is, therefore, the main object of the present invention to facilitate the exchanging and positioning of a backing diaphragm by removing it from the stud bolt and by placing a replacement close to the existing teflon diaphragm without the need of pulling the cross pin out of the stud shaft.

DETAILED DESCRIPTION OF PREFERRED EMBODIMENTS

A preferred embodiment of the invention consists in providing each backing diaphragm with a through-going central bore corresponding in diameter to the shaft of the stud bolt and with two through-going slots extending from the bore in opposite direction, the width and the length of each slot corresponding to the dimensions of the protruding ends of the cross pin in a manner permitting the diaphragm to be slipped over this pin without obstruction.

This is an improvement over the conventional central bore provided in the existing backing diaphragms and avoids the keeping of a large stock of assembled Teflon ® and backing diaphragms for every kind of corrosive fluid, since it permits easy and ready exchange.

Figure 1:
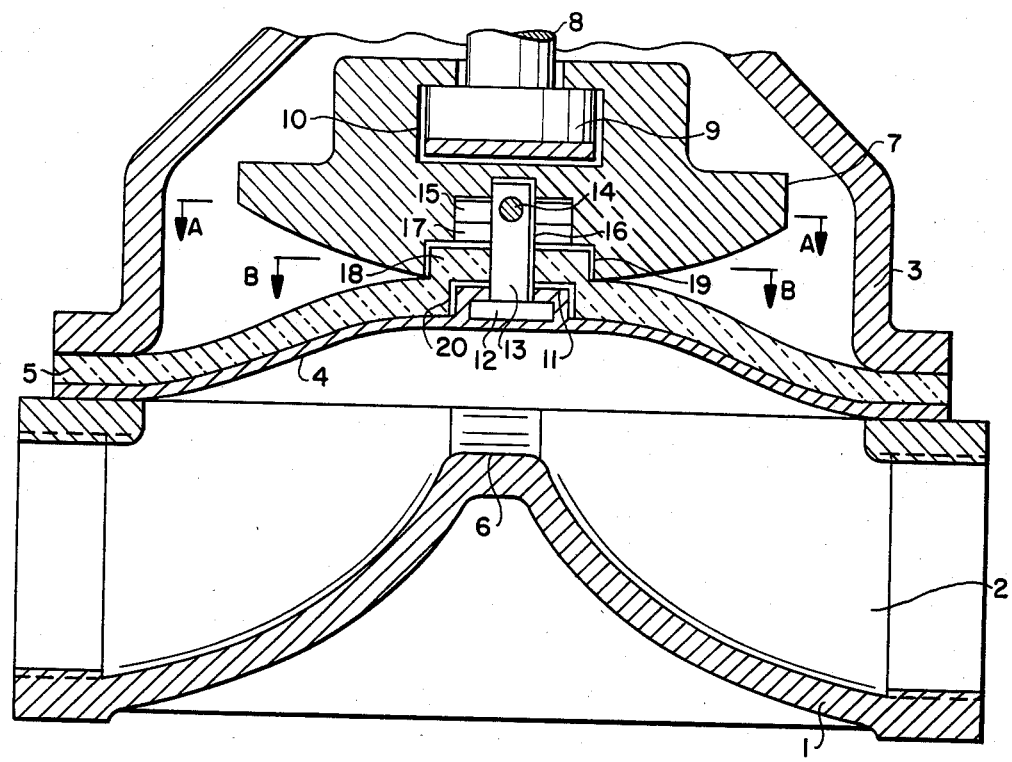
Figure 2:
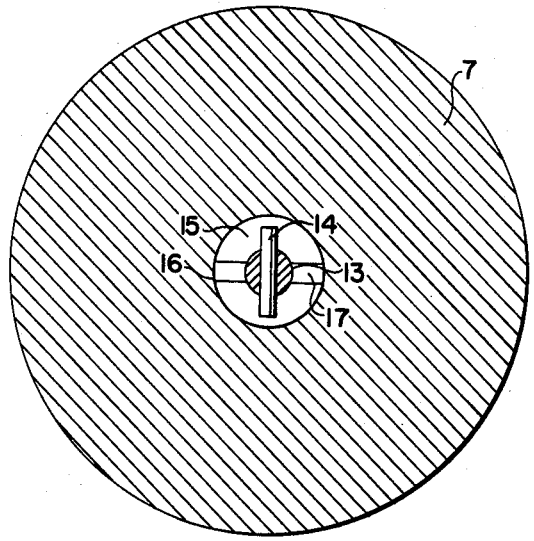
Figure 3:
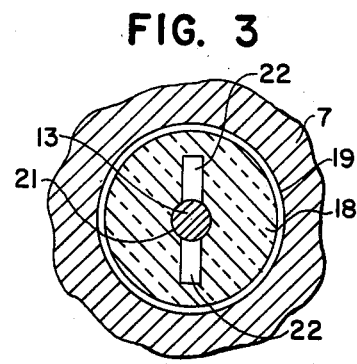
Figure 4:
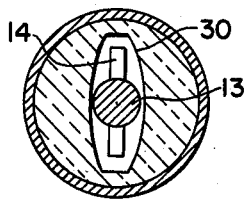

The invention will be better understood from the following description of a preferred embodiment thereof, reference being had to the accompanying drawing, wherein FIG. 1 is a part section through a diaphragm valve of the kind referred to, FIG. 2 is a section through the compressor body along the line A—A of FIG. 1, FIG. 3 is a section through the backing diaphragm along line B—B of FIG. 1, and FIG. 4 is a plan view of another embodiment of the perforation of the backing diaphragm.

With reference to FIGS. 1, 2 and 3 of the drawing, a diaphragm valve comprises a valve body 1 defining a flow passage 2, a bonnet 3 secured to the body by bolts (not visible), a teflon diaphragm 4 and a backing diaphragm 5 both clamped at their margins between the body 1 and the bonnet 3. The body inside is shaped to form a curved valve seat 6 onto which the Teflon ® diaphragm is pressed by a compressor 7 by way of an interposed backing diaphragm, causing the closing of the flow passage 2. The compressor, in its turn, is movable in upward and downward direction by a spindle 8 provided with an enlarged head 9 at its bottom end, which engages with a recess 10 in the compressor.

The Teflon ® diaphragm is provided with an upwardly extending central boss 11 which firmly encloses the head 12 of a stud bolt 13. The shaft of the stud bolt 13 penetrates through a central bore 21 in the backing diaphragm 5 into a recess 15 inside the compressor 7 and is secured therein by a pin 14 firmly fastened in a transverse bore in the top of the stud shaft. The recess, as shown in FIG. 2 consists of a central hole 16 in the bottom center of the compressor which is crossed by a slot 17 corresponding in size to the dimensions of the pin 14, this hole being enlarged in the interior of the compressor to permit angular displacement of the pin.

The arrangement as described hereinbefore is that known and applied in a conventional diaphragm valve in connection with the attachment of the diaphragm to the compressor. The novel aspect of the invention is in respect of the backing diaphragm 5 which is of identical outer dimensions as the Teflon ® diaphragm 4, and is positioned between the latter and the compressor 7. Diaphragm 5 is provided with an upstanding boss 18 cooperating with a corresponding recess 19 in the bottom portion of the compressor and, in its underside, with a recess 20 cooperating with the boss 11 of the teflon diaphragm. The boss 18 is perforated by a central hole 21 of a size permitting the passage of the stud shaft 13 therethrough, and by a slot 22 crossing the hole 21 centrally, the slot being of a size permitting the passage of the pin 14 therethrough.

The assembly of the valve components comprises the following steps: The backing diaphragm is placed over the teflon diaphragm in that the shaft 13 and the pin 14 are first pushed through the perforation (21, 22) in the boss 18. The two diaphragms are now angularly displaced by turning one of them about a right angle in respect of the other, and thereafter the shaft and the pin are inserted into the recess 15 of the compressor through the hole 16 and the slot 17 in the bottom portion of the compressor, and the two diaphragms together are again rotated about a right angle so as to retain the pin in the recess and to prevent its slipping out through the slot 17. The edges of the two diaphragms are now compressed between the body 1 and the bonnet 3 by means of bolts passing through holes in the corners of all components to be assembled.

The form of the perforation (21, 22) of the boss 18 are shown in FIG. 3 is advantageous in that it provides central guidance of the shaft 13 in the hole 21, after the pin 14 has been pushed through the diaphragm into the recess 15 of the compressor. However, a similar result can be achieved by an elliptical or oblong perforation 30 as shown in FIG. 4 of the drawing. The width of the oblong perforation should correspond to the diameter of the stud shaft 13, thus performing a guiding action of the shaft in the diaphragm.

Still another embodiment comprises a circular perforation through the boss 18, of a diameter corresponding to the length of the pin 14. This perforation permits the passage of the shaft and the pin in any relative position of the two diaphragms.

It will be understood that the size and shape of the perforation in the boss 18 is not limited to the three embodiments described in the foregoing, but that a perforation of any other shape or size must permit the passage of the pin 14 without, however, weakening the construction of the diaphragm itself.

It will be furthermore understood that the invention is not limited to the specific design of the diaphragm valve illustrated in FIG. 1, but that it may be applied to any type of valve as long as connection between diaphragm and compressor is of the kind employing a stud and a pin therethrough.

I claim:

1. A diaphragm valve for corrosive fluids, comprising
   (1) a valve body comprising a valve seat means for controlling movement of fluid through said valve;
   (2) a diaphragm comprised of (a) a main diaphragm comprising an anticorrosive material and (b) a backing diaphragm; and
   (3) compressor means for releasably depressing said diaphragm against said valve seat such that said movement of fluid through said valve is impeded, said compressor means comprising a slotted recess and a stud provided with a cross pin which engages said slotted recess, wherein said backing diaphragm has a perforation dimensioned such that both said stud and said cross pin are provided unobstructed passage through said perforation, permitting replacement of said backing diaphragm without removal of said cross pin from said stud.

2. A diaphragm valve according to claim 1, wherein said perforation is in a central portion of said backing diaphragm.

3. A diaphragm valve according to claim 1, wherein said stud comprises a shaft having a first flanged end embedded in said main diaphragm and second end through which said cross pin passes.

4. A diaphragm valve according to claim 2, wherein said anticorrosive material is polytetrafluoroethylene.

5. A diaphragm valve according to claim 3, wherein said perforation comprises (a) a circular hole having a diameter corresponding to that of said shaft and (b) a slot extending across said circular hole, the size of said slot corresponding to the dimensions of said cross pin.

6. A diaphragm valve according to claim 3, wherein said perforation comprises an oblong hole having a length corresponding to the length of said cross pin and a width corresponding to the diameter of said shaft.

7. A diaphragm valve according to claim 3, wherein said perforation comprises a circular hole having a diameter corresponding to at least the length of said cross pin.

* * * * *